US008934426B2

(12) United States Patent
Yuan et al.

(10) Patent No.: US 8,934,426 B2
(45) Date of Patent: Jan. 13, 2015

(54) METHOD AND APPARATUS FOR DETERMINING CHANNEL QUALITY INDEX IN MULTIPLE USER-MIMO COMMUNICATION NETWORKS

(75) Inventors: Jun Yuan, Kanata (CA); Sophie Vrzic, Nepean (CA); Mo-Han Fong, Ottawa (CA); Robert Novak, Ottawa (CA); Dong-Sheng Yu, Ottawa (CA); Jianglei Ma, Kanata (CA)

(73) Assignee: Apple Inc., Cupertino, CA (US)

( * ) Notice: Subject to any disclaimer, the term of this patent is extended or adjusted under 35 U.S.C. 154(b) by 422 days.

(21) Appl. No.: 13/265,639

(22) PCT Filed: Apr. 21, 2010
(Under 37 CFR 1.47)

(86) PCT No.: PCT/CA2010/000639
§ 371 (c)(1),
(2), (4) Date: Jun. 4, 2012

(87) PCT Pub. No.: WO2010/121385
PCT Pub. Date: Oct. 28, 2010

(65) Prior Publication Data
US 2013/0128820 A1    May 23, 2013

Related U.S. Application Data

(60) Provisional application No. 61/171,292, filed on Apr. 21, 2009.

(51) Int. Cl.
| | | |
|---|---|---|
| H04W 4/00 | (2009.01) | |
| H04W 72/08 | (2009.01) | |
| H04B 7/04 | (2006.01) | |
| H04W 36/38 | (2009.01) | |

(52) U.S. Cl.
CPC ........... *H04W 72/085* (2013.01); *H04B 7/0452* (2013.01); *H04W 36/385* (2013.01)
USPC ............................. 370/329; 370/332; 370/334

(58) Field of Classification Search
CPC ...... H04W 72/04; H04W 88/08; H04W 76/00
USPC ................................. 370/329, 328; 455/456.1
See application file for complete search history.

(56) References Cited

U.S. PATENT DOCUMENTS

2009/0252091 A1* 10/2009 Tang et al. ..................... 370/328
2009/0285177 A1* 11/2009 Chin et al. ..................... 370/331

FOREIGN PATENT DOCUMENTS

| CN | 101325441 | 12/2007 |
| JP | 2008-306732 | 12/2008 |
| WO | 2008147121 | 12/2008 |
| WO | 2008152612 | 12/2008 |
| WO | WO 2008152612 A2 * | 12/2008 |
| WO | 2009026768 | 3/2009 |

OTHER PUBLICATIONS

International Search Report and Written Opinion issued for PCT/CA2010/000639, issued Jul. 12, 2010.

* cited by examiner

*Primary Examiner* — Andrew Lai
*Assistant Examiner* — Jamaal Henson
(74) *Attorney, Agent, or Firm* — Fay Kaplun & Marcin, LLP

(57) ABSTRACT

In order to minimize the control signaling overhead associated with transmitting CQI data from mobile stations to base stations in wireless communication networks supporting MU-MIMO, the CQI during MU-MIMO operation is estimated based on SU-MIMO CQI data, mobile station geometry data, and mobile station PMI (Precoding Matrix Index) data. More particularly, the base station maintains and updates a knowledge pool that correlates geometry data and learned impact of interfering precoder data to degradation of CQI values responsive to switching from SU-MIMO operation to MU-MIMO operations. Then, when the base station switches from SU-MIMO operation to MU-MIMO operation, it consults the knowledge pool to predict the degradation in CQI and subtracts them from the known, pre-switching SU-MIMO CQI feedback data for each relevant mobile station to predict the post-switching MU-MIMO CQIs for that mobile station.

20 Claims, 5 Drawing Sheets

METHOD AND APPARATUS FOR DETERMINING CHANNEL QUALITY INDEX IN MULTIPLE USER-MIMO COMMUNICATION NETWORKS

CROSS REFERENCE TO RELATED APPLICATIONS

This application is the U.S. national phase of PCT/CA2010/000639, filed Apr. 21, 2010, which claims priority to U.S. provisional application No. 61/171,292 filed on Apr. 21, 2009, which is incorporated herein fully by reference.

FIELD OF THE INVENTION

The invention pertains to the exchange of channel quality information in a wireless communication system. More particularly, the invention pertains to the determination of channel quality index in communication networks that support Multiple-User (MU) Multiple-Input and Multiple-Output (MIMO) or MU-MIMO operation, such as IEEE 802.16-based networks.

BACKGROUND OF THE INVENTION

IEEE 802.16 is a series of wireless broadband standards developed by the IEEE (Institute of Electrical and Electronic Engineers) and is incorporated herein fully by reference. IEEE 802.16e uses OFDMA (Orthogonal Frequency Division Multiple Access) to carry data. It supports adaptive modulation and coding so that, when channel quality conditions are relatively good, more efficient, but less robust coding schemes may be used, e.g., 64 QAM (Quadrature Amplitude Modulation), so as to maximize the total number of channels or data that can be transmitted per unit time. However, when channel quality conditions are relatively poor, less efficient, but more robust modulation and coding schemes may be used, e.g., BPSK (Binary Phase Shift Keying), so as to increase channel quality (but at the cost of lower data transmission rates). Any number of different modulation schemes may be supported depending on channel conditions. For instance, under the best conditions, a 64 QAM modulation scheme may be selected, and, under the worst conditions a BPSK modulation scheme may be selected. When channel conditions are between the two extremes, other intermediate modulation schemes having intermediate compromises between efficiency and robustness may be selected, such as 16 QAM, QPSK, etc.

IEEE 802.16 also supports Hybrid Automatic Repeat Request (HARQ) for improved error detection and correction performance.

Another feature of IEEE 802.16 is MIMO operation. MIMO is a feature in which the transceivers in the network each have multiple transmit and/or receive antennas so as to permit directional beam patterns that can be aimed by the transmitter in the direction of the intended receiver and/or vice versa in order to improve signal strength to the intended receiver without increasing power at the transmitter. It also tends to decrease interference between channels and improve NLOS (Non-Line-Of-Sight) characteristics.

Single-user MIMO, or SU-MIMO, refers to use of MIMO in which only one transmitter and receiver communicate at any given time on any given communication resource unit. Multiple-User MIMO, or MU-MIMO, is a technique by which a transmitter, e.g., a base station, uses MIMO to simultaneously transmit two different signals to two different receivers in the same communication resource unit. More particularly, since the transmitter can beamform the transmission beams, it can direct the data/signals intended for one receiver (e.g., mobile station) toward that receiver and direct the data/signals intended for another receiver toward the other receiver. If the two beams are directed in sufficiently different directions and the two receivers are sufficiently far apart from the transmitter such that, at each receiver, the data signals intended for that receiver are substantially stronger than the data/signals intended for the other receiver operating on the communication resource unit, the two receivers can share the same channel.

It is well known that, in OFDM, each downlink communication channel between a base station and a mobile station actually comprises a certain subset of sub-carrier frequencies and a certain subset of time slots (e.g., within a frame) in the overall time and frequency spectrum available to the network. As described above, in MU-MIMO, the base station transmits to two (or more) mobile stations within the same subsets of timeslots and frequencies. In other words, in MU-MIMO, the base station is supporting two distinct communication channels on the same subset of timeslots and frequencies. That is why, in order to avoid confusion in this specification, the term "communication resource unit" is used herein to refer to a given subset of timeslots and frequencies; and the term "communication channel" is used to refer to an individual downlink with an individual mobile station.

Networks that support MU-MIMO operation often will operate in SU-MIMO until the call load exceeds a certain threshold; and then switch some or all of the calls to MU-MIMO operation in order to support a greater number of simultaneous calls, albeit of lower quality. In some networks, when switching from SU-MIMO operation to MU-MIMO operation, the communication resource units may remain the same size (i.e., occupy the same number of sub-carrier-frequencies and timeslots per unit time) and are just shared by two (or more) mobile stations. However, in some networks, the communication resource units for MU-MIMO operation may be a different size (presumably larger—occupying more sub-carrier frequencies and/or timeslots per unit time) than the SU-MIMO communication resource units so as to lessen the degradation in the communication quality for each mobile station sharing the MU-MIMO communication resource unit, but at the expense of a smaller increase in overall call capacity.

In wireless communication networks having adaptive modulation and coding (AMC), such as IEEE 802.16 networks, it is typically the base stations that decide which modulation and coding schemes to use. As mentioned above, such decisions are commonly based on some measurement of the quality of the channel, and particularly the downlink channel. Since a base station cannot directly measure the quality of its own downlink channels, the mobile stations are adapted to determine the downlink channel quality, such as by observing the pilot bits in the downlink channel, the bit error correction rates on the received data, etc., and then transmit channel quality data back to the base station on the control channel. For instance, in IEEE 802.16, the mobile stations transmit a parameter called CQI (Channel Quality Index) to the base station. There are several techniques for generating and transmitting CQI in IEEE 802.16, including codebook-based CQI and sounding-based CQI. In codebook-based CQI, there is a limited number of possible CQI values, each CQI value corresponding to a channel condition. Both the mobile station and base station have the codebook that discloses the meaning of each of those possible CQI values. The mobile station sends CQI value to the base station requiring very little bandwidth and the base station plugs that CQI value into the codebook to determine what it signifies. For instance, the codebook may reveal, among other things, that a CQI value of 4 means that the base station should select a modulation scheme of 16 QAM with a ½ coding rate.

Nevertheless, when in MU-MIMO mode, it may be necessary to transmit a great deal of CQI data per mobile station because the mobile stations do not have any information about the other mobile stations with which they may be sharing a communication resource unit.

SUMMARY OF THE INVENTION

In order to minimize the control signaling overhead associated with transmitting CQI data from mobile stations to base stations in wireless communication networks supporting MU-MIMO, the CQI during MU-MIMO operation is estimated based on SU-MIMO CQI data, mobile station geometry data, and mobile station PMI (Precoding Matrix Index) data. More particularly, the base station maintains and updates a knowledge pool that correlates geometry data and learned impact of interfering precoder data to degradation of CQI values responsive to switching from SU-MIMO operation to MU-MIMO operations. Then, when the base station switches from SU-MIMO operation to MU-MIMO operation, it consults the knowledge pool to predict the degradation in CQI and subtracts it from the known, pre-switching SU-MIMO CQI feedback data for each relevant mobile station to predict the post-switching MU-MIMO CQI for that mobile station.

This saves a significant amount of overhead communication associated with CQI and PMI feedback since, in MU-MIMO, the mobile station does not know the identify of the other mobile station(s) with which it is sharing a communication resource unit in MU-MIMO operation. Therefore, each mobile station would have to transmit large amounts of CQI data, such as best CQI and worst CQI with respect to different interfering mobile stations, in order for the base station to determine channel quality in an MU-MIMO channel.

DETAILED DESCRIPTION OF THE EMBODIMENTS

Figure 1:
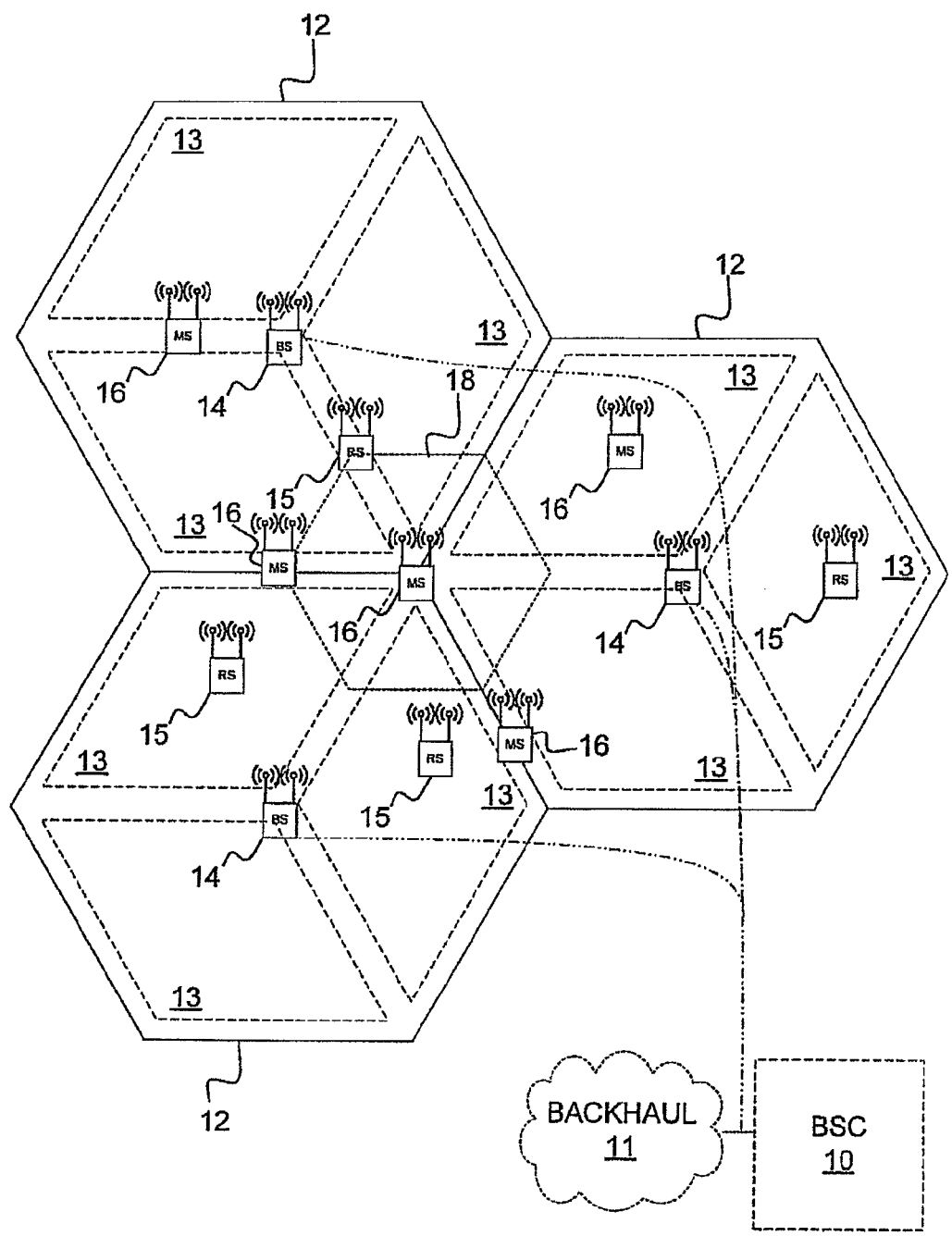
FIG. 1 is a block diagram representing an exemplary cellular communication network in which the present invention is implemented.

FIG. 1 illustrates the basic components of an exemplary cellular communication network implementing the present invention. A base station controller (BSC) 10 controls wireless communications within multiple cells 12, which cells are served by corresponding base stations (BSs) 14. In some configurations, each cell is further divided into multiple sectors 13 or zones (not shown). In general, each base station 14 facilitates communication using OFDM with mobile and/or wireless terminals (hereinafter mobile stations) 16 that are within the cell 12 associated with the corresponding base station 14. The movement of the mobile station 16 in relation to the base stations 14 results in significant fluctuations in channel conditions. As illustrated, the base stations 14 and mobile stations 16 each include multiple antennas to provide spatial diversity for communication. In some configurations, relay stations 15 may be provided to assist in communications between base stations 14 and mobile stations 16. Mobile station 16 may be handed off 18 from any cell 12, sector 13, zone (not shown), base station 14 or relay 15 to another cell 12, sector 13, zone (not shown), base station 14 or relay 15. In some configurations, base stations 14 communicate with each other and with another network (such as a core network or the Internet, both not shown) over a backhaul network 11. In some configurations, a base station controller 10 is not needed.

In OFDM modulation, the transmission band for each communication resource unit is divided into multiple, orthogonal carrier waves. Each carrier wave is modulated according to the digital data to be transmitted. Because OFDM divides the transmission band into multiple carriers, the bandwidth per carrier is reduced and the modulation time per carrier is increased as compared to single carrier techniques. Since the multiple carriers are transmitted in parallel, the transmission rate for the digital data or symbols on any given carrier is lower than with single carrier techniques.

OFDM modulation utilizes the performance of an inverse fast Fourier transform (IFFT) on the information to be transmitted. For demodulation, the performance of a fast Fourier transform (FFT) on the received signal recovers the transmitted information. In practice, the IFFT and FFT are provided by digital signal processing carrying out suitable algorithms, respectively. Accordingly, the characterizing feature of OFDM modulation is that orthogonal carrier waves are generated for multiple bands within a transmission resource unit. The modulated signals are digital signals having a relatively low transmission rate capable of staying within their respective bands. The individual carrier waves are not modulated directly by the digital signals. Rather, the carrier waves are all modulated at once by IFFT algorithm.

In operation, OFDM is preferably used for at least downlink transmission from a base station to the mobile stations. Each base station 14 is equipped with n transmit antennas and each mobile station is equipped with m receive antennas. Notably, the respective antennas can be used for reception as well as transmission by using appropriate duplexers or switches.

Figure 2:
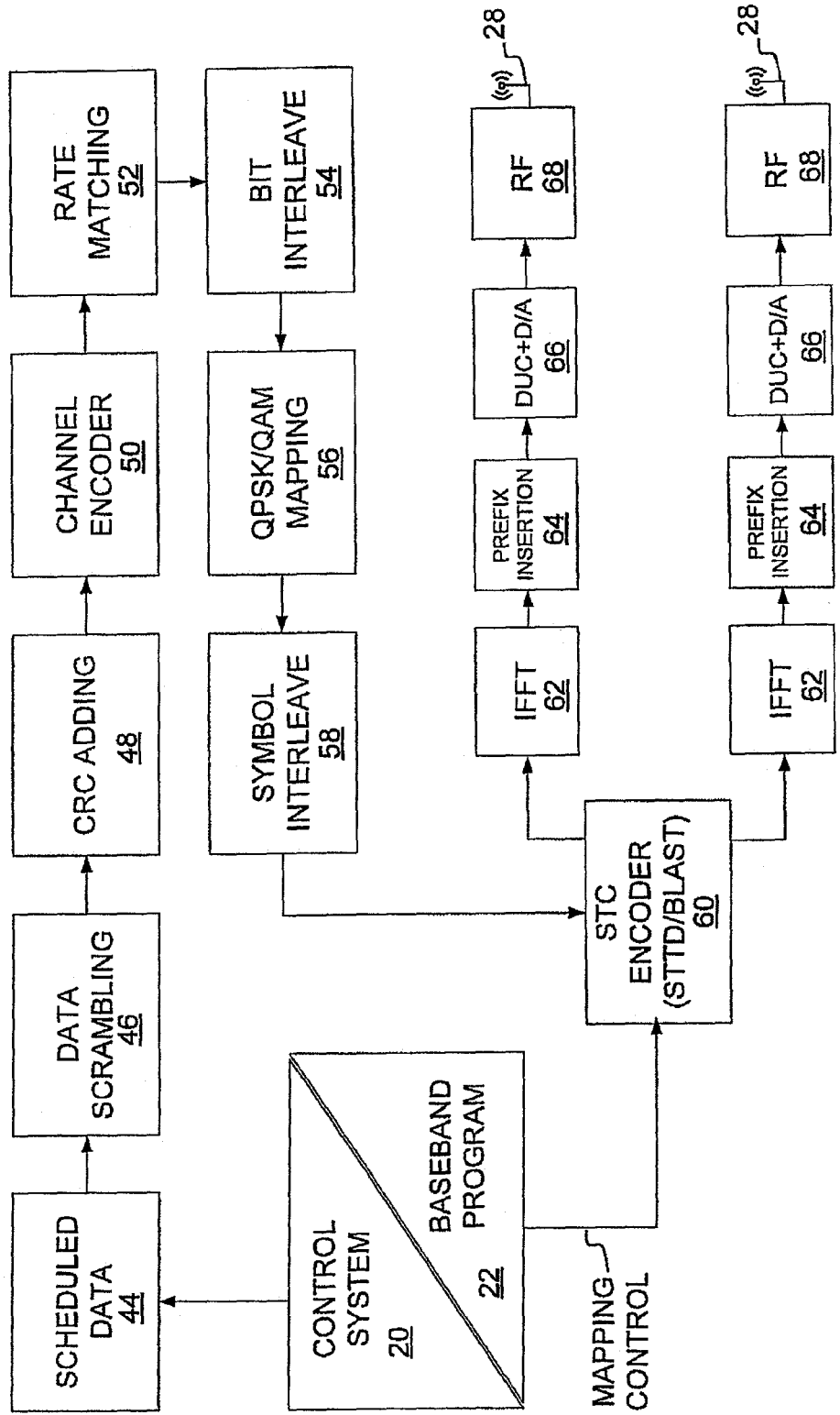
FIG. 2 is a block diagram of a logical breakdown of an exemplary OFDM transmitter architecture.

With reference to FIG. 2, a logical OFDM transmission architecture will be described. Initially, the base station controller 10 will send data to a base station 14 that is intended to transmitted by that base station 14 to various mobile stations 16, either directly or with the assistance of a relay station 15. The base station 14 may use the CQIs associated with the mobile stations to schedule the data for transmission as well as select the appropriate modulation and coding schemes for transmitting scheduled data. The CQIs may be received directly from the mobile stations 16 or may be determined at the base station 14 based on information provided by the mobile stations 16. In either case, the CQI for each mobile station 16 is a function of the degree to which the channel amplitude (or response) varies across the OFDM frequency band.

Scheduled data 44, which is a stream of bits, is scrambled in a manner reducing the peak-to-average power ratio associated with the data by data scrambling logic 46. A cyclic redundancy check (CRC) for the scrambled data is determined and appended to the scrambled data by CRC adding logic 48.

Channel coding is performed by channel encoder logic 50 to effectively add redundancy to the data to facilitate recovery and error correction at the mobile station 16. Again, the channel coding for a particular mobile station 16 is based on the CQI. In some implementations, the channeling coder logic uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, QAM or QPSK modulation is used. However, if channel quality is particularly poor, BSK or other highly robust modulation techniques may be used also. The degree of modulation is preferably chosen based on the CQI determined for the particular mobile station. The symbols may be systematically reordered to further bolster the immunity of the transmitted signal to periodic data loss caused by frequency selective fading by symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile station 16. The STC encoder logic 60 will process the incoming signals and provide n outputs corresponding to the number of transmit antennas of a base station 14. The control system 20 and/or baseband processor 22 will provide a mapping control signal to control STC encoding. At this point, the symbols for the n outputs are representative of the data to be transmitted and capable of being recovered by the mobile station 16.

Assuming that the base station has two antennas 28, i.e., n=2, then the STC encoder logic outputs two streams of symbols. Accordingly, each of the symbol streams output by the STC encoder logic 60 is sent to a corresponding IFFT processor 62, illustrated separately for ease of understanding. Those skilled in related arts will recognize that one or more processors may be used to provide such digital signal processing, alone or in combination with other processors described herein. The IFFT processors 62 preferably will operate on the respective symbols to provide an inverse Fourier transform thereof. The output of the IFFT processors 62 provides symbols in the time domain. The time domain symbols are grouped into frames, which are associated with a prefix by prefix insertion logic 64. Each of the resulting signals is up-converted in the digital domain to an intermediate frequency and converted to an analog signal by a corresponding digital up-conversion (DUC) and digital-to-analog (DA) conversion circuit 66. The resultant (analog) signals are then simultaneously modulated at the desired RF frequency, amplified, and transmitted via the RF circuitry 68 and antennas 28. Notably, pilot signals known by the intended mobile station 16 are scattered among the sub-carriers. The mobile station 16, which is discussed in detail below, will use the pilot signals for channel estimation.

Figure 3:
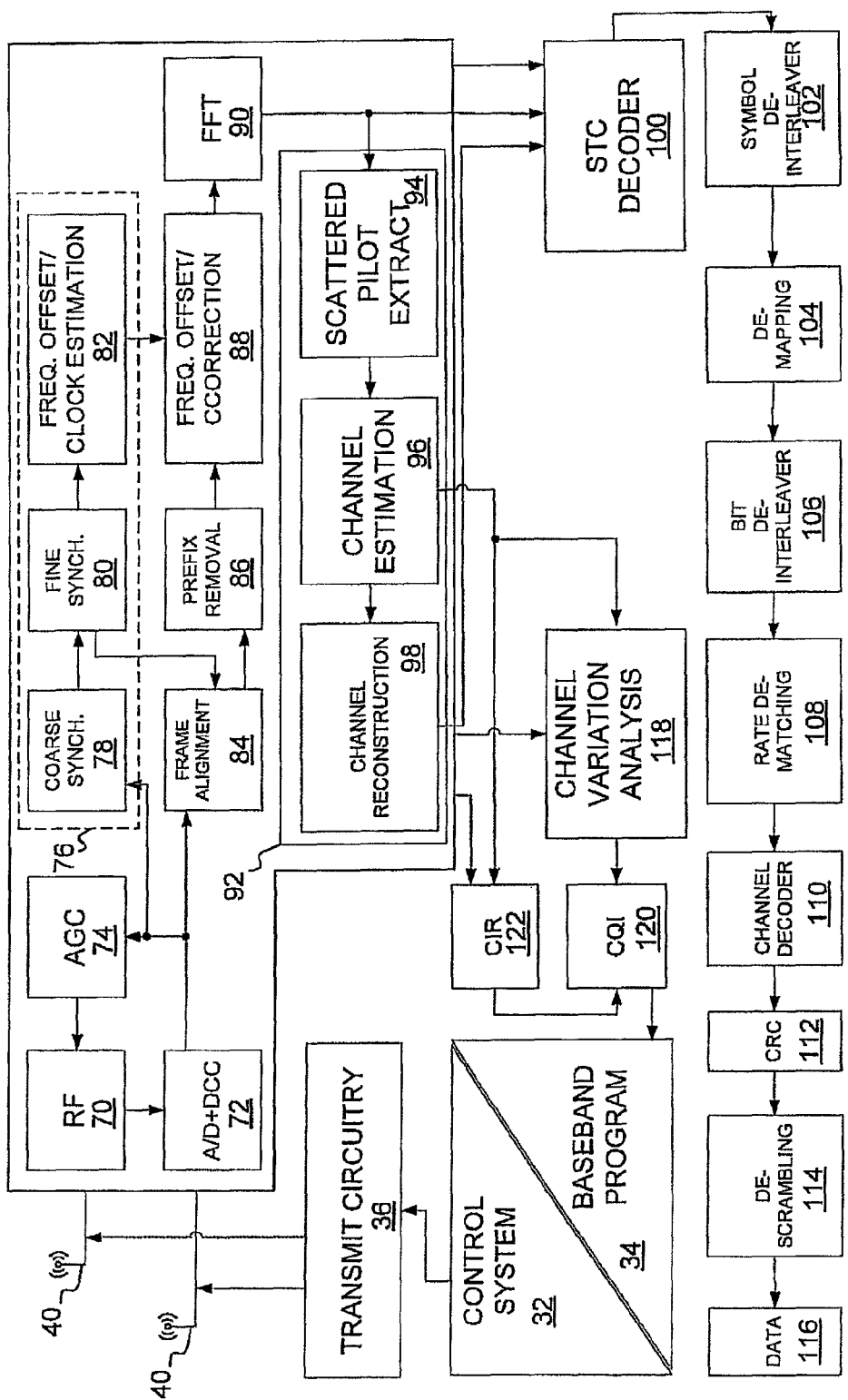
FIG. 3 is a block diagram of a logical breakdown of an exemplary OFDM receiver architecture.

FIG. 3 illustrates the process of receiving the transmitted signal at the mobile station 16, either directly from base station 14 or with the assistance of a relay 15. Upon arrival of the transmitted signals at each of the antennas 40 at the mobile station 16, the respective signals are demodulated and amplified by corresponding RF circuitry 70. For the sake of conciseness and clarity, only one of the two receiver halves is described and illustrated in detail. Analog-to-digital (A/D) converter and down-conversion circuitry 72 digitize and down-convert the analog signal for digital processing. The resultant digitized signals may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise frame starting position based on the headers. The output of the fine synchronization logic 80 facilitates frame acquisition by framing alignment logic 84. Proper framing alignment is important so that subsequent FFT processing provides an accurate conversion from the time domain to the frequency domain. The fine synchronization algorithm is based on the correlation between received pilot signals carried by the headers and a local copy of the known pilot data. Once a frame alignment acquisition occurs, the prefix of the OFDM symbol is removed by prefix removal logic 86 and the resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sensed to processing logic 92. The processing logic 92 extracts the scattered pilot signal using scattered pilot extraction logic 94, determines the channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency.

The processing logic 92 compares the received pilot symbols with the pilot symbols that are expected in certain sub-carriers at certain time-slots to determine the channel response for the sub-carriers in which pilot symbols were transmitted. The results are interpolated to estimate channel response for most, if not all, of the remaining sub-carriers within which pilot symbols were not provided. The actual and interpolated channel responses are used to estimate an overall channel response, which includes the channel responses for most, if not all, of the sub-carriers in the OFDM channel.

The frequency domain symbols and channel reconstruction estimation, which are derived from the channel responses from each received path, are provided to an STC decoder 100. The STC decoder 100 provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. De-interleaver symbols are then demodulated or de-mapped to a corresponding bitstream using de-mapping logic 104. The bits are then de-interleaved using de-interleaver logic 106, which corresponds to the bit interleaver logic 54 of the transmitter architecture. The de-interleaved bits are then processed by rate de-matching logic 108 and presented to channel decoder logic 110 to recover the initially-scrambled data and the CRC checksum. Accordingly, CRC logic 112 removes the CRC checksum, checks the scrambled data in traditional fashion, and provides it to the de-scramble logic 114 for de-scrambling using the known base station de-scramble code to recover the originally-transmitted data 116.

In parallel to recovering the data 116, a CQI, or at least information sufficient to allow the base station 14 to create a CQI, is determined and transmitted to the base station 14. As noted above, the CQI may be a function of the carrier-to-interference ratio (CR) as well as the degree to which the channel response varies across the various sub-carriers in the OFDM frequency band. For this embodiment, the channel gain for each sub-carrier in the OFDM frequency band will be used to transmit information as compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band used to transmit data.

FIGS. 1 to 3 provide one specific example of a communication system that could be used to implement embodiments of the present invention. It is to be understood that embodiments of the present invention can be implemented with communications systems having architectures that are different than this specific example, but that operate in a manner consistent with the implementation of the embodiments as described herein.

Many wireless telecommunication systems and standards, including IEEE 802.16, 3GGP Long Term Evolution (LTE), and UMB have adopted or at least have support for codebook-based close-loop (CL) MIMO, which, as described above, allows the mobile units to send a very small piece of CQI data, which the base station can convert using a codebook into robust information about the channel quality.

Also as previously noted, Multiple-User (MU) MIMO is also supported by IEEE 802.16, LTE, and UMB. MU-MIMO permits the network to increase the number of communication channels that can be supported simultaneously by sharing a single OFDM communication resource unit between two or more mobile stations using essentially space division multiple access (SDMA).

In codebook-based MU-MIMO, the mobile stations feed back their CQI and Precoder Matrix Index (PMI) values to the base station for use by the base station for, among other things, determining what modulation and coding schemes to use for communication with the corresponding mobile station.

Precoding refers to the process of beamforming with multiple transmit antennas by appropriate weighing of the signals supplied to each transmitting antenna so that signal strength is maximized at the receiver. The PMI, therefore, is a dataset that the mobile station sends to the base station informing the base station of what particular precoding scheme the mobile station wants the base station to use for downlink communications from the base station to the mobile station. However, it should be noted that many communication networks also permit the base station to override the mobile station's precoding scheme request and select its own precoding scheme and inform the mobile station of that precoding scheme so that the mobile station can correctly receive the data from the base station. In any event, both the CQI and PMI transmitted from the mobile station to the base station are indicative of the channel quality.

In MU-MIMO, the mobile station does not know the identity of the other mobile station or stations with which it is sharing the OFDM communication resource unit. Hence, a large amount of CQI feedback must be transmitted to provide reasonably sufficient information for the base station to make a well informed decision about what modulation and coding schemes to utilize with those mobile stations. For instance, this information may include multiple CQIs for SU-MIMO and MU-MIMO separately, e.g., SU-CQI, best MU-CQI, worst MU-CQI, possibly including multiple best and worst for MU-CQIs for different possible precoding schemes for communication with other mobile stations. (The other mobile station or stations with which a given mobile station shares an OFDM communication resource unit in MU-MIMO will hereinafter be referred to sometimes as the interfering precoder or precoders.) This increased control signaling overhead for transmitting CQI and PMI control data is undesirable.

In accordance with the present invention, instead of requiring the mobile stations to transmit large amounts of CQI feedback data when entering and in MU-MIMO mode, the base station incorporates knowledge pool circuitry that maintains and updates a knowledge pool that correlates mobile station geometry information and/or information learned about the impact of interfering precoders to expected CQI degradation. The expected CQI degradation is then combined with the CQI feedback data from a mobile station while in SU-MIMO operation to predict its MU-MIMO CQI.

More particularly, each base station maintains a knowledge pool that comprises a mapping of interfering precoder information and user geometry information to degradation of SU-MIMO CQI feedback. The information on the impact of interfering precoders can be obtained from HARQ (hybrid automatic repeat requests) statistics received during SU-MIMO and MU-MIMO operation, as will be described in more detail below.

The geometry information may be any available information indicative of channel quality, such as SNR (signal-to-noise ratio) or BER (bit error rate). In one embodiment disclosed in Kumar, S.; Monghal, G Nin, J.; Ordas, I.; Pedersen, K. I.; Mogensen, P. E, *Autonomous Inter Cell Interference Avoidance under Fractional Load for Downlink Long Term Evolution*, Vehicular Technology Conference, 2009, VTC Spring 2009, IEEE 69th published 12 Jun. 2009 (ISSN 1550-2252; Print ISBN: 978-1-4244-2517-4), it is the ratio between the desired received signal power that one mobile station receives ($P_S$) and the total inter-cell interference ($P_I$) plus noise ($P_N$) averaged over fast fading, i.e.:

$$\text{Geometry (or } G\text{-factor)} = P_S/(P_I + P_N)$$

Figure 4:
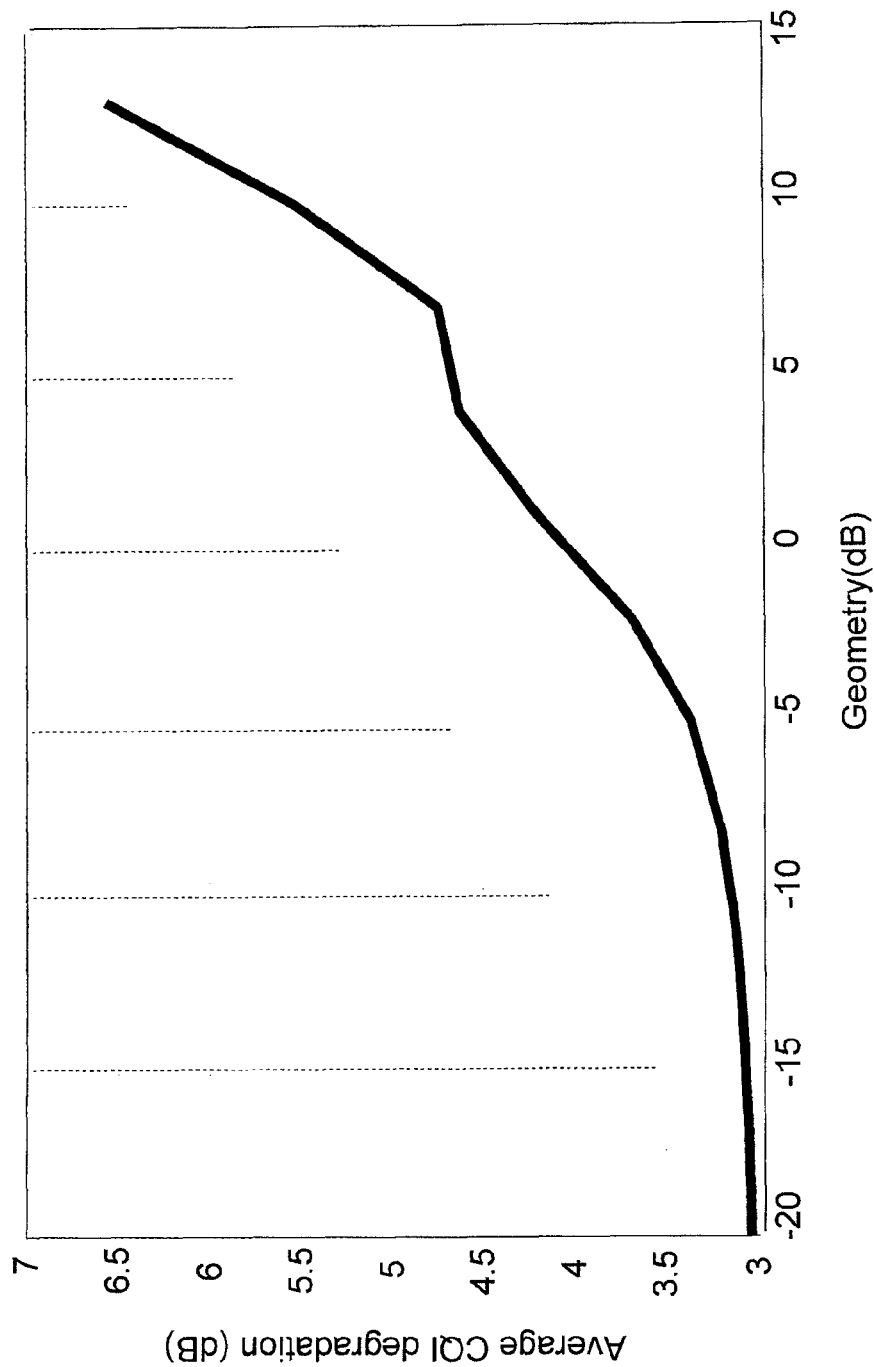
FIG. 4 is a graph illustrating the correlation between geometry and CQI degradation responsive to switching from SU-MIMO to MU-MIMO operation.

FIG. 4 is a graph showing an exemplary correlation between geometry and CQI degradation when switching from SU-MIMO to MU-MIMO. For instance, when the geometry factor is low, e.g., −20 dB, the average CQI degradation when switching from SU-MIMO to MU-MIMO operation is 3d B. When the geometry is 0 dB, switching from SU-MIMO to MU-MIMO results in an average CQI degradation of 4.5 dB. At a geometry factor of 10 dB, the switch results in an average CQI degradation of almost 6 dB. Thus, it can be seen that the geometry of a mobile station has an influence on the amount of CQI degradation to be expected when the system switches from SU-MIMO to MU-MIMO.

The impact on CQI of different interfering precoders may be collected by having the base station compare the HARQ statistics in the first OFDM frame after it has been switched from SU-MIMO to MU-MIMO operation to the HARQ statistics of the last frame before switching from SU-MIMO to MU-MIMO operation. The increase in automatic repeat requests (ARQs) between these two frames typically correlates well to CQI degradation due to the interfering precoder.

In operation, each mobile station feeds back its preferred single-user PMI data and its CQI data to the base station during SU-MIMO operation. When the base station decides to schedule MU-MIMO operation, it pairs two or more mobile stations to share a MU-MIMO resource unit and adjusts the CQIs of those two mobile stations as dictated by the knowledge pool mapping. A resource unit is a particular combination of OFDM sub-carriers and timeslots. Might be the same unit as for SU-MIMO or could be different.

More particularly, circuitry in the base station receives and stores the SU-MIMO CQI received from each of the mobile stations in its cell. It also receives and stores the preferred single-user PMI reported by each of those mobile stations. Finally, the mobile stations also can be configured to transmit geometry information, such as the aforementioned G-factor, to the base station so that the base station also receives and stores geometry information of each mobile station. Geometry information may be determined, for instance, upon network entry and thereafter at other appropriate times, such as at fixed intervals and/or upon the occurrence of certain defined events.

When the base station decides to initiate MU-MIMO operation, it knows the PMI and CQI for all the mobile stations in its cell and can use this information to determine which mobile stations to combine in a MU-MIMO resource unit. At that point, for each mobile station about to be placed in MU-MIMO mode with one or more other mobile stations, predicting circuitry at the base station can plug in that mobile station's most recent geometry information and the most recent preferred PMI received from the other mobile station(s) with which that mobile station will share the OFDM communication resource unit into the knowledge pool and determine the predicted degradation in CQI as a function of that interfering precoder information and geometry information.

The base station then takes the last reported SU-MIMO CQI value for that mobile station and subtracts from it the predicted CQI degradation to arrive at the predicted MU-MIMO CQI for that mobile station. This would be done for each mobile station sharing a communication resource unit. Precoder selection circuitry in the base station would then select modulation and coding schemes for downlink transmissions to that mobile station from the CQI codebook based upon the predicted CQI. Optionally, the predicted CQI may have some further offset or correction factor applied to it.

In one embodiment, a knowledge pool can be separately maintained for each mobile station. Alternatively, the data for multiple mobile stations can be maintained collectively in a single knowledge pool and the knowledge pool information for the multiple mobile stations can be used to predict the CQI degradation of each individual mobile station when switched from SU-MIMO mode to MU-MIMO mode. Furthermore, each base station can maintain its own knowledge pool(s) or the entire network or any portion thereof, e.g. a BSC, can collect information for each mobile station across a plurality of base stations/cells or of the entire network.

The nature in which the knowledge pool correlates interfering precoder information and/or geometry factor information to CQI degradation can take many forms in accordance with the principles of the present inventions. In one simple example, the expected SU-MIMO to MU-MIMO CQI degradation as a function of interfering precoder modulation scheme may be maintained in one table and the expected CQI degradation as a function of geometry factor can be maintained in another table and the two CQI degradation numbers from the tables can simply be added to each other to obtain a total predicted CQI degradation value.

In more complex embodiments, algorithms may be employed to factor in any interrelationship of interfering precoder modulation scheme and geometry factor on each other in affecting CQI.

Figure 5:
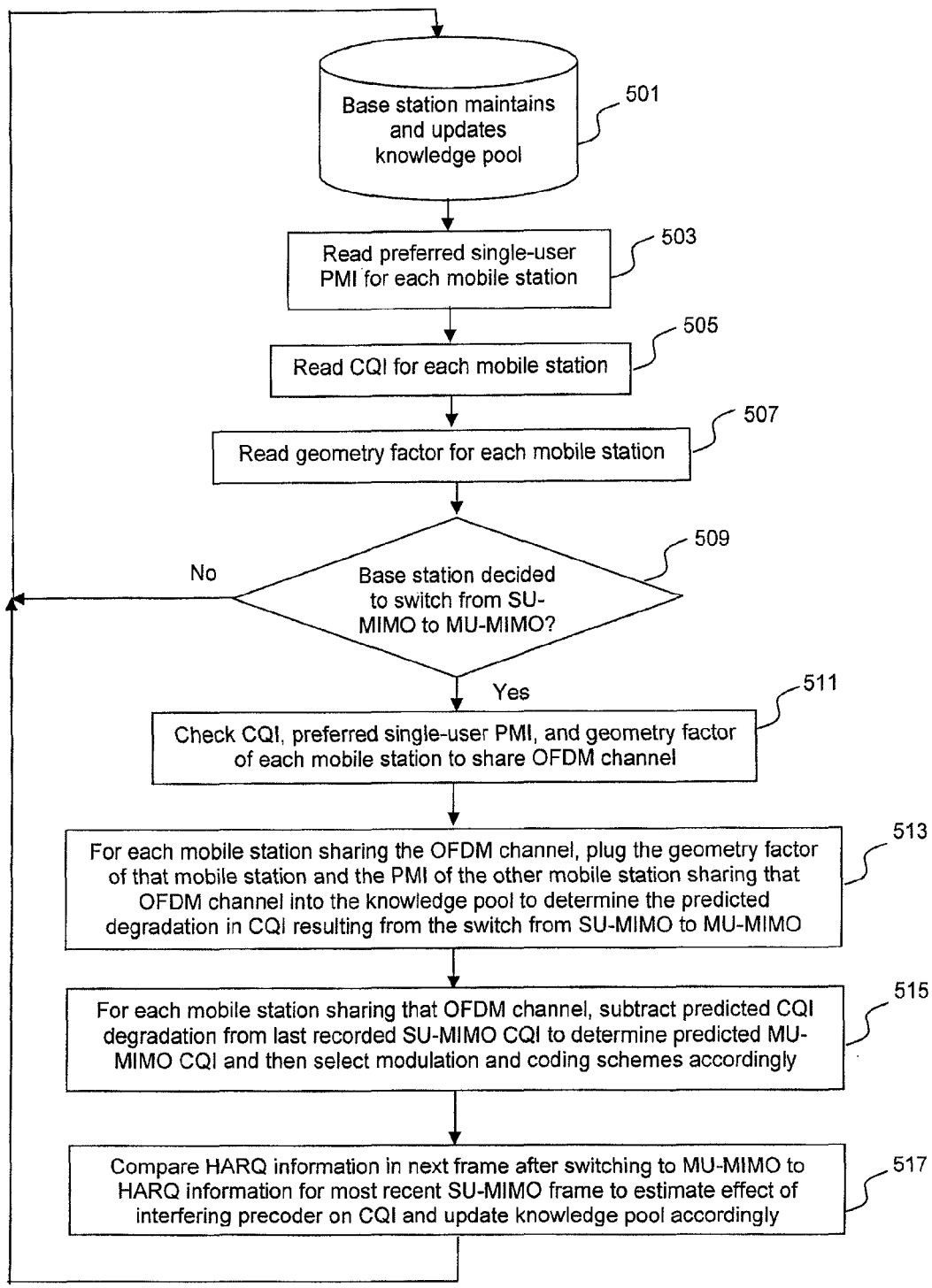
FIG. 5 is a flow diagram illustrating base station operation in accordance with one particular embodiment of the present invention.

FIG. 5 is a diagram conceptually illustrating the operation of a base station in accordance with the principles of one embodiment of the present invention. It should be understood that the flow diagram is conceptual in order to illustrate the processes salient to the present invention and does not represent actual operation of the base station processing, which would include many other processes and steps. Furthermore, some of the "steps" in the flow chart represent activities that occur continuously or are interrupt-driven such that they do not occur at specific times. In fact, the overall order of the steps in the flow chart is merely exemplary.

As shown in step 501, the base station continuously maintains and updates a knowledge pool correlating interfering PMI and geometry information to CQI degradation.

In step 503, the base station receives and stores the preferred PMI requested by each mobile station within the corresponding cell for SU-MIMO operation. This step is actually carried out continuously by a base station under normal operating conditions.

Next in step 505, the base station receives and stores the CQI from each mobile station in the corresponding cell. Again, this is an operation that may occur normally and continuously in the base station as part of normal operating protocol.

Next, in step 507, the base station reads the geometry factor received from each mobile station. This also may be performed continuously by the base station under normal operating conditions.

Next, in step 509, when the base station decides to switch from SU-MIMO mode to MU-MIMO mode with respect to one or more OFDM communication resource units, flow will proceed to and through steps 511, 513, 515 and 517. On the other hand, if the base station does not decide to switch into MU-MIMO mode, steps 511 through 517 would not be performed. Rather, the base station will simply continue to operate in normal SU-MIMO mode, which is represented in the diagram simply as flow branching back to the first step 501.

The base station typically will operate in SU-MIMO mode when the call load is below a certain threshold in order to provide the highest quality reception in each channel. However, if the load exceeds a certain threshold, e.g., the number of available channels, it will switch into MU-MIMO mode in order to service the increased call load, albeit likely with lower channel quality. In this example, we shall assume that, in MU-MIMO mode, only two mobile stations share an OFDM communication resource unit in MU-MIMO.

Thus, in step 511, the base station checks the CQI, PMI, and geometry factor of both mobile stations that are to share a given OFDM communication resource unit. Next, in step 513, for each of those mobile stations, the base station consults the knowledge pool to determine the predicted CQI degradation as a function of (i) the geometry factor of that mobile station and (2) the interfering PMI of the other mobile station. Next, in step 515, the base station subtracts the predicted CQI degradation from the last recorded SU-MIMO CQI for that mobile station to determine a new, MU-MIMO CQI for that mobile station. The base station, among other things, then selects a modulation scheme and a coding scheme as a function of the predicted MU-MIMO CQI for each of those mobile stations.

Finally, in step 517, for each mobile station sharing the communication resource unit, the base station compares the HARQ information in the first frame after switching to MU-MIMO mode to the HARQ information for the most recent SU-MIMO frame and estimates the effect of the interfering precoder of the other mobile station on the CQI of each of those mobile stations and updates the interfering precoder information in the knowledge pool accordingly.

It will be understood that the present invention may be implemented within a base station, relay station, or other node of a network. The processes disclosed herein may be performed entirely within a single node of the network or may be distributed amongst a plurality of different nodes, such as one or more base stations and base station controllers (BSCs). Furthermore, the processes may be implemented by any number of types of circuitry, including, but not limited to, a programmed general purpose computer, a digital signal processor, combinational logic circuitry, analog circuitry, Application Specific Integrated Circuits (ASICs), firmware, hardware, software, and various combinations of any of the preceding. Furthermore, it will be understood that many of the steps disclosed herein may be performed by equipment that conventionally exists in a base station or other node of a network. Merely as one example, the transmitting and receiving of the various data discussed herein may be carried out using the existing transmitters, receivers, data processors, antennas, and other equipment already existing in the various nodes of a wireless network for carrying out all other communication of data and control signals in the network.

The present invention does not necessarily require any modification to the mobile stations to operate in accordance with the invention. However, other mobile stations can be readily modified to operate in accordance with the principles of the present invention.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A base station in a wireless communication network for communicating wirelessly with a plurality of mobile stations, the base station supporting Multiple-User Multiple-Input and Multiple-Output (MU-MIMO) communication comprising:
   a transmitter;
   a receiver;
   a plurality of antennas;
   knowledge base circuitry that maintains a knowledge base of correlation of geometry of each mobile station and a precoding scheme of each other mobile station to differences in communication channel quality between the base station and each mobile station for single-user MIMO operation versus Multiple-User MIMO operation;
   determining circuitry that determines a precoding scheme selected by each mobile station for single-user MIMO operation, single-user MIMO channel quality data for each mobile station, and geometry data for each mobile station, wherein the determining circuitry further determines a pair of two or more mobile stations to share a first communication resource unit while the two or more mobile stations operate in MU-MIMO operation, the first communication resource unit including orthogonal frequency-division multiplexing (OFDM) sub-carrier and timeslot data; and
   predicting circuitry that, responsive to switching a first mobile station of the pair from single-user MIMO operation to Multiple-User MIMO operation, uses the knowledge base to map the precoding scheme data and the geometry data corresponding to each of the mobile stations sharing the first communication resource unit to a predicted channel quality degradation for each of the first mobile station and the second mobile station.

2. The base station of claim 1 wherein, for each mobile station sharing the first communication resource unit while in MU-MIMO operation, the predicting circuitry uses the knowledge pool to determine the predicted effect on channel quality caused by switching from single-user MIMO to Multiple-User MIMO of (a) the geometry of that mobile station and (b) the interference effect of the selected single-user precoding scheme of each other mobile station sharing the first communication resource unit.

3. The base station of claim 2 further comprising:
   precoder selecting circuitry for selecting a modulation scheme for downlink communication for each of the mobile stations sharing the first communication resource unit in MU-MIMO operation as a function of the respective predicted degradation in channel quality and single-user MIMO channel quality data for that mobile station.

4. The base station of claim 1 wherein the base station uses orthogonal frequency multiple access in the downlink communication channels.

5. The base station of claim 4 wherein the channel quality information comprises a Channel Quality Index (CQI) received via the antennas from the mobile stations.

6. The base station of claim 1 wherein the knowledge base circuitry maintains a separate knowledge base for each mobile station.

7. The base station of claim 1 wherein the knowledge base circuitry maintains a collective knowledge base for a plurality of mobile stations.

8. The base station of claim 1 wherein the geometry information for each mobile station comprises a geometry factor received via the antennas from the mobile stations.

9. The base station of claim 1 wherein the geometry information for each mobile station is obtained during network entry.

10. The base station of claim 1 further comprising:
    circuitry for receiving hybrid automatic repeat requests (HARQ) from mobile stations with which it is communicating; and
    circuitry for:
    (a) comparing HARQ statistics for communications with the first mobile station while in single-user MIMO operation to HARQ statistics for communications with the first mobile station while in Multiple-User MIMO operation sharing a communication resource unit with at least one second mobile station, said at least one second mobile station using a particular precoding schemes to generate comparison data; and
    (b) using the comparison data to estimate an effect on the channel quality of the first mobile station of the particular precoder scheme of the at least one second mobile station, wherein the data in the knowledge pool as to the correlation of communication channel quality on precoding scheme of the at least one second mobile station with which the first mobile station shares a communication resource unit is developed at least partially from the comparison data.

11. The base station of claim 1 further comprising:
circuitry for receiving hybrid automatic repeat requests (HARQ) from mobile stations with which it is communicating; and
circuitry for
 (a) comparing HARQ statistics for communications with the first mobile station while in single-user MIMO operation to HARQ statistics for communications with the first mobile station in a first frame after entry into Multiple-User MIMO operation while sharing a communication resource unit with at least one second mobile station, said at least one second mobile station using a particular precoding scheme to generate comparison data;
 (b) using the comparison data to estimate an effect on the channel quality of the first mobile station of the particular precoder scheme of the at least one second mobile station, wherein the data in the knowledge pool as to the correlation of communication channel quality on precoding scheme of the at least one second mobile station with which the first mobile station shares a communication resource unit is developed at least partially from the HARQ statistics comparison data.

12. A method of predicting downlink channel quality between a base station and a mobile station in a wireless communication network in Multiple-User Multiple-Input and Multiple-Output (MU-MIMO) operation, the method comprising:
 maintaining a knowledge base of correlation of geometry of each mobile station and a precoding scheme of at least each other mobile station to differences in communication channel quality between the base station and each mobile station for single-user MIMO operation versus Multiple-User MIMO operation;
 determining a precoding scheme selected by each mobile station for multi-user MIMO operation, single-user MIMO channel quality data for each mobile station, and geometry data for each mobile station;
 determining a pair of two or more mobile stations to share a first communication resource unit while the two or more mobile stations operate in MU-MIMO operation, the first communication resource unit including orthogonal frequency-division multiplexing (OFDM) sub-carrier and timeslot data;
 responsive to switching a first mobile station of the pair from single-user MIMO operation to Multiple-User MIMO operation, using the knowledge base to map the precoding scheme data and the geometry data corresponding to each of the mobile stations sharing the first communication resource unit to a predicted channel quality degradation for each of the first mobile station and the second mobile station; and
 selecting a modulation scheme for downlink communication for each mobile station sharing the first communication resource unit as a function of the predicted degradation in channel quality and the single-user MIMO channel quality data.

13. The method of claim 12 wherein, for each mobile station sharing the first communication resource unit while in MU-MIMO operation, mapping uses the knowledge pool to predict the effect on channel quality caused by switching from single-user MIMO to Multiple-User MIMO of (a) the geometry of that mobile station and (b) the interference effect of the selected precoding scheme of each other mobile station sharing the first communication resource unit.

14. The method of claim 12 wherein the selecting of a modulation scheme comprises selecting the modulation scheme as a further function of the single-user MIMO channel quality of the corresponding mobile station.

15. The method of claim 12 wherein the base station uses orthogonal frequency multiple access in the downlink communication channels and the channel quality information comprises a Channel Quality Index (CQI) measured by the mobile stations.

16. The method of claim 12 further comprising:
 comparing HARQ statistics for communications between the base station and the first mobile station while in single-user MIMO operation to HARQ statistics for communications between the base station and the first mobile station while in Multiple-User MIMO operation while sharing a communication resource unit with the at least one second mobile station, said at least one second mobile station using a particular precoding scheme to generate comparison data; and
 using the comparison data to estimate an effect on the channel quality of the first mobile station of the particular precoder scheme of the at least one second mobile station, wherein the data in the knowledge pool as to the correlation of communication channel quality on precoding scheme of the at least one second mobile station with which the first mobile station shares a communication resource unit is developed at least partially from the comparison data.

17. A method of estimating downlink channel quality between a base station and a mobile station in a wireless communication network while in Multiple-User Multiple-Input and Multiple-Output (MU-MIMO) operation, said network using orthogonal frequency division multiple access (OFDMA) modulation and supporting both single-user MIMO (SU-MIMO) and MU-MIMO communication protocols in downlink communication channels, the method comprising:
 maintaining a knowledge base of correlation of geometry of the mobile station and a precoding scheme of at least a second mobile station to differences in a downlink communication channel quality between the base station and each mobile station for SU-MIMO operation versus MU-MIMO operation;
 determining a precoding scheme selected by each mobile station for multi-user MIMO operation, a single-user MIMO CQI for each mobile station, and geometry data for each mobile station;
 determining a pair of two or more mobile stations to share a first communication resource unit while the two or more mobile stations operate in MU-MIMO operation, the first communication resource unit including orthogonal frequency-division multiplexing (OFDM) sub-carrier and timeslot data; and
 responsive to switching a first mobile station of the pair from SU-MIMO operation to MU-MIMO operation using the knowledge base to map the precoding scheme data and the geometry data corresponding to each of the mobile stations sharing the first communication resource unit to a predicted channel quality degradation for each of the first mobile station and the second mobile station.

18. The method of claim 17 wherein, for each mobile station sharing the first communication resource unit while in MU-MIMO operation, the mapping uses the knowledge pool to predict the effect on channel quality caused by switching from single-user MIMO to Multiple-User MIMO of (a) the geometry of that mobile station and (b) the interference effect of the selected precoding scheme of each other mobile station sharing the first communication resource unit.

19. The method of claim 17 further comprising:
selecting a modulation scheme for downlink communication in the first communication resource unit for each of the mobile stations sharing the first communication resource unit while in MU-MIMO operation as a function of the predicted degradation in channel quality and the SU-MIMO CQI for that mobile station.

20. The method of claim 17 further comprising:
comparing HARQ statistics for communications between the base station and the first mobile station while in SU-MIMO operation to HARQ statistics for communications between the base station and the first mobile station while in MU-MIMO operation while sharing a communication resource unit with the at least second mobile station, said at least one second mobile station using a particular precoding scheme to generate comparison data; and using the comparison data to estimate an effect on the CQI of the first mobile station of the particular precoder scheme of the at least one second mobile station, wherein the data in the knowledge pool as to the correlation of CQI on precoding scheme of the at least one second mobile station with which the first mobile station shares a communication resource unit is developed at least partially from the comparison data.

* * * * *